United States Patent
Katayama

(10) Patent No.: US 10,361,644 B2
(45) Date of Patent: Jul. 23, 2019

(54) MOTOR DRIVING CONTROLLER AND MOTOR DRIVING CONTROL METHOD

(71) Applicant: MINEBEA MITSUMI INC., Kitasaku-gun, Nagano (JP)

(72) Inventor: Keiichi Katayama, Yonago (JP)

(73) Assignee: MINEBEA MITSUMI INC., Nangano (JP)

( * ) Notice: Subject to any disclaimer, the term of this patent is extended or adjusted under 35 U.S.C. 154(b) by 0 days.

(21) Appl. No.: 15/404,746

(22) Filed: Jan. 12, 2017

(65) Prior Publication Data

US 2017/0222578 A1 Aug. 3, 2017

(30) Foreign Application Priority Data

Jan. 28, 2016 (JP) .................................. 2016-014667

(51) Int. Cl.
| | |
|---|---|
| *H02P 1/04* | (2006.01) |
| *H02P 6/20* | (2016.01) |
| *H02P 6/16* | (2016.01) |
| *H02P 27/08* | (2006.01) |
| *H02P 1/46* | (2006.01) |

(52) U.S. Cl.
CPC .................. *H02P 6/16* (2013.01); *H02P 1/46* (2013.01); *H02P 6/20* (2013.01)

(58) Field of Classification Search
USPC ........................................... 318/400.38, 470
See application file for complete search history.

(56) References Cited

U.S. PATENT DOCUMENTS

| 5,850,130 | A | 12/1998 | Fujisaki et al. |
| 2002/0050800 | A1* | 5/2002 | Miyazaki ................ H02P 6/182 |
| | | | 318/400.11 |
| 2002/0109479 | A1 | 8/2002 | Kishibe et al. |

(Continued)

FOREIGN PATENT DOCUMENTS

| CN | 1193496 C | 3/2005 |
| CN | 1240179 C | 2/2006 |

(Continued)

OTHER PUBLICATIONS

Chinese Office Action dated Oct. 12, 2018 for corresponding Chinese Application No. 201710032821.7 and English translation.

(Continued)

*Primary Examiner* — Jorge L Carrasquillo
(74) *Attorney, Agent, or Firm* — Pearne & Gordon LLP

(57) ABSTRACT

A motor driving controller, comprising a rotary position detection device generating a position detection signal corresponding to a rotary position of a rotor of a motor; a control circuit selecting a first driving control signal for performing rectangular wave driving or a second driving control signal for performing driving with an overlapped energization period longer than an overlapped energization period in the rectangular wave driving, based on the position detection signal, thereby to output a driving control signal; and a motor driver outputting a driving signal to a stator coil of the motor based on the driving control signal, wherein the control circuit outputs the first driving control signal at time of starting, and the control circuit outputs the second driving control signal when a rotary state is detected on the basis of the position detection signal.

8 Claims, 8 Drawing Sheets

(56) References Cited

U.S. PATENT DOCUMENTS

| | | | | |
|---|---|---|---|---|
| 2003/0123178 A1* | 7/2003 | Gotou | ...................... | H02P 6/22 |
| | | | | 318/400.11 |
| 2006/0023337 A1 | 2/2006 | Gotou et al. | | |
| 2009/0162038 A1* | 6/2009 | Tategami | ................ | E05F 15/40 |
| | | | | 388/809 |
| 2014/0084824 A1 | 3/2014 | Hano et al. | | |
| 2016/0126870 A1* | 5/2016 | Katayama | ................. | H02P 6/08 |
| | | | | 318/723 |

FOREIGN PATENT DOCUMENTS

| | | | |
|---|---|---|---|
| CN | 103684129 A | | 3/2014 |
| JP | H10-75597 A | | 3/1998 |
| JP | H10-225164 A | | 8/1998 |
| JP | 2001-268973 A | | 9/2001 |
| JP | 2008-252965 A | | 10/2008 |
| JP | 2012-257429 A | | 12/2012 |
| JP | 2012257429 A | * | 12/2012 |

OTHER PUBLICATIONS

Japanese Office Action dated Feb. 13, 2018 for corresponding Japanese Application No. 2016-014667 and English translation.
2nd Chinese Office Action dated Mar. 11, 2019 for corresponding Chinese Application No. 201710032821.7 and English translation.

* cited by examiner

20: CONTROL CIRCUIT
40: MOTOR DRIVER
40a: PRE-DRIVE CIRCUIT
40b: INVERTER CIRCUIT

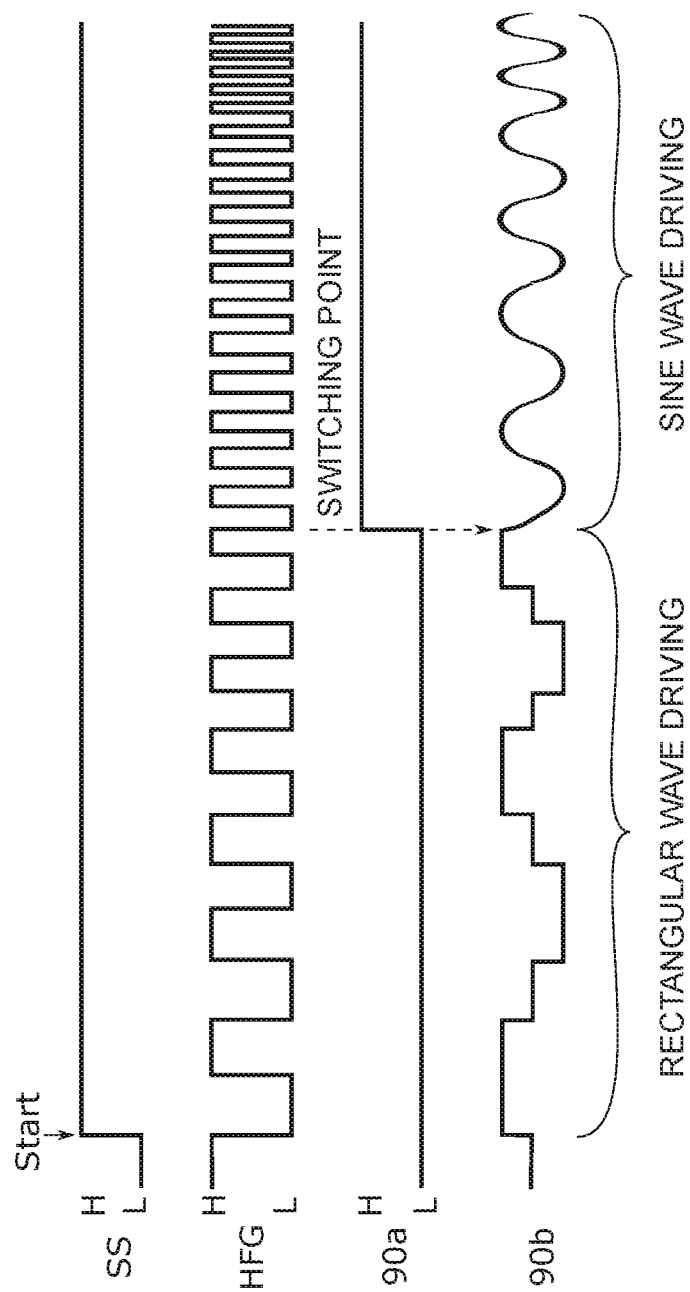

MOTOR DRIVING CONTROLLER AND MOTOR DRIVING CONTROL METHOD

CROSS REFERENCE TO RELATED APPLICATIONS

This application claims the benefit of Japanese Patent Application No. 2016-014667, filed on Jan. 28, 2016, which is hereby incorporated by reference in its entirety.

BACKGROUND

Technical Field

The present disclosure relates to a motor driving controller for driving a motor and a motor driving control method for the motor driving controller.

Background Art

Conventionally, a motor driving controller for driving a brushless motor has been known. For example, JP Unexamined Patent Application Publication. No. 2012-257429 discloses a motor driving controller for driving a brushless motor. In the motor driving controller described in JP Unexamined Patent Application Publication. No. 2012-257429, when a motor is started from a stopped state, the motor is driven to rotate by rectangular wave driving as a first driving system and when a stable rotation is achieved, the driving system is switched from the first driving system to sine wave driving as a second driving system.

The rectangular wave drive has almost no overlapping energization period between coils of respective phases at the time of commutation. Therefore, the rectangular wave driving has characteristics such that a coil current changes drastically thereby causing large vibrations and driving sounds while an output torque is large and step out is unlikely. On the other hand, though there is possibility of step-out, the sine wave driving has a longer overlapping energization period between coils of respective phases at the time of commutation in comparison with the rectangular wave driving, and therefore a coil current changes relatively softly to allow the sine wave driving to have a characteristic such as small vibrations and small driving sounds. Thus, at the time of starting, when the rotor starts to rotate with large fluctuations of the torque and the commutation easily occurs, the following method is adopted. Namely, the driving is effected in accordance with the rectangular wave driving system and, when the steady rotation is about to occur, the system is switched to the sine wave driving system to attenuate the driving sounds at the time of the steady rotation.

However, fan products such as an electric fan, an air cleaner and a ventilating fan are used more frequently under a silent environment such as at night. Therefore, even the noises due to the rectangular wave driving at the time of starting may cause uncomfortableness and the required level of the noise reduction is made far higher. As a result of analyzing the uncomfortableness with this background taken into consideration, the knowledge to the effect that the uncomfortableness increases depending on the sound pressure level of the noises at the time of starting and the duration of the noises at the time of starting has been obtained. Thus, in order to attenuate the uncomfortableness, the way to lower the sound pressure level of the noises at the time of starting by the rectangular wave driving and the method used to shorten the duration of the rectangular wave driving are considered to be effective.

In order to lower the sound pressure level, it is conceivable to enhance the rigidity of components of a motor to suppress the vibration of a motor and to provide a rubber member for absorbing the vibration of a motor. In these cases, the mass of the motor driving controller increases, the cost of the motor driving controller becomes higher and the labor for producing the motor driving controller increases. As described above, the conventional motor driving controller had room for improvement from the viewpoint of restricting the increase in mass and costs as well as attenuating the uncomfortableness of the starting noises. The above-described problem may occur in not only the fan product, but also in a motor for other use.

The present disclosure is related to providing a motor driving controller and a motor driving control method, which can attenuate uncomfortableness due to starting noises by shortening starting time with rectangular wave driving as much as possible in a brushless motor in which a driving waveform is changed.

SUMMARY

A motor driving controller according to one aspect of the present disclosure comprises: a rotary position detection device generating a position detection signal corresponding to a rotary position of a rotor of a motor; a control circuit selecting a first driving control signal for performing rectangular wave driving or a second driving control signal for performing driving with an overlapped energization period longer than an overlapped energization period in the rectangular wave driving, based on the position detection signal, thereby to output a driving control signal; and a motor driver outputting a driving signal to a stator coil of the motor based on the driving control signal, wherein the control circuit outputs the first driving control signal at time of starting, and the control circuit outputs the second driving control signal when a rotary state is detected on the basis of the position detection signal.

According to this aspect of the present disclosure, in a brushless motor in which a driving waveform is changed, the motor is started by the rectangular wave driving and when it is detected that the motor is in the rotary state, the driving is switched to the driving that makes the overlapped energization period of the stator coil longer. Therefore, time of the rectangular wave driving is shortened to be capable of attenuating the uncomfortableness of the starting noises.

Another aspect of the present disclosure relates to a motor driving control method. The motor driving control method executed by a motor driving controller, the motor controller including a rotary position detection device generating a position detection signal corresponding to a rotary position of a rotor of a motor, a control circuit selecting a first driving control signal for performing rectangular wave driving or a second driving control signal for performing driving with an overlapped energization period longer than an overlapped energization period in the rectangular wave driving, based on the position detection signal, thereby to output a driving control signal, and a motor driver outputting a driving signal to a stator coil of the motor based on the driving control signal, the motor driving control method comprising; outputting the first driving control signal from the control circuit at time of starting; and outputting the second driving control signal from the control circuit when a change in polarity of the position detection signal is detected.

According to this aspect of the present disclosure, in a brushless motor in which a driving waveform is changed, the motor is started by the rectangular wave driving and when a change in polarity of the position detection signal is detected, the driving is switched to the driving that makes the overlapped energization period of the stator coil longer. Therefore, time of the rectangular wave driving is shortened to be capable of attenuating the uncomfortableness of the starting noises.

Arbitrary combination of the above components and mutual replacement of the components and expressions of the present disclosure between the method and the device, etc., too, are effective as an aspect of the present disclosure.

According to the present disclosure, it is possible to provide a motor driving controller and a motor driving control method, which can attenuate uncomfortableness due to starting noises by shortening time of the rectangular wave driving at the time of starting in a brushless motor in which a driving waveform is changed.

BRIEF DESCRIPTION OF THE DRAWINGS

FIG. 9 is a timing chart for switching of driving waveforms in the prior art.

DETAILED DESCRIPTION

Figure 1:
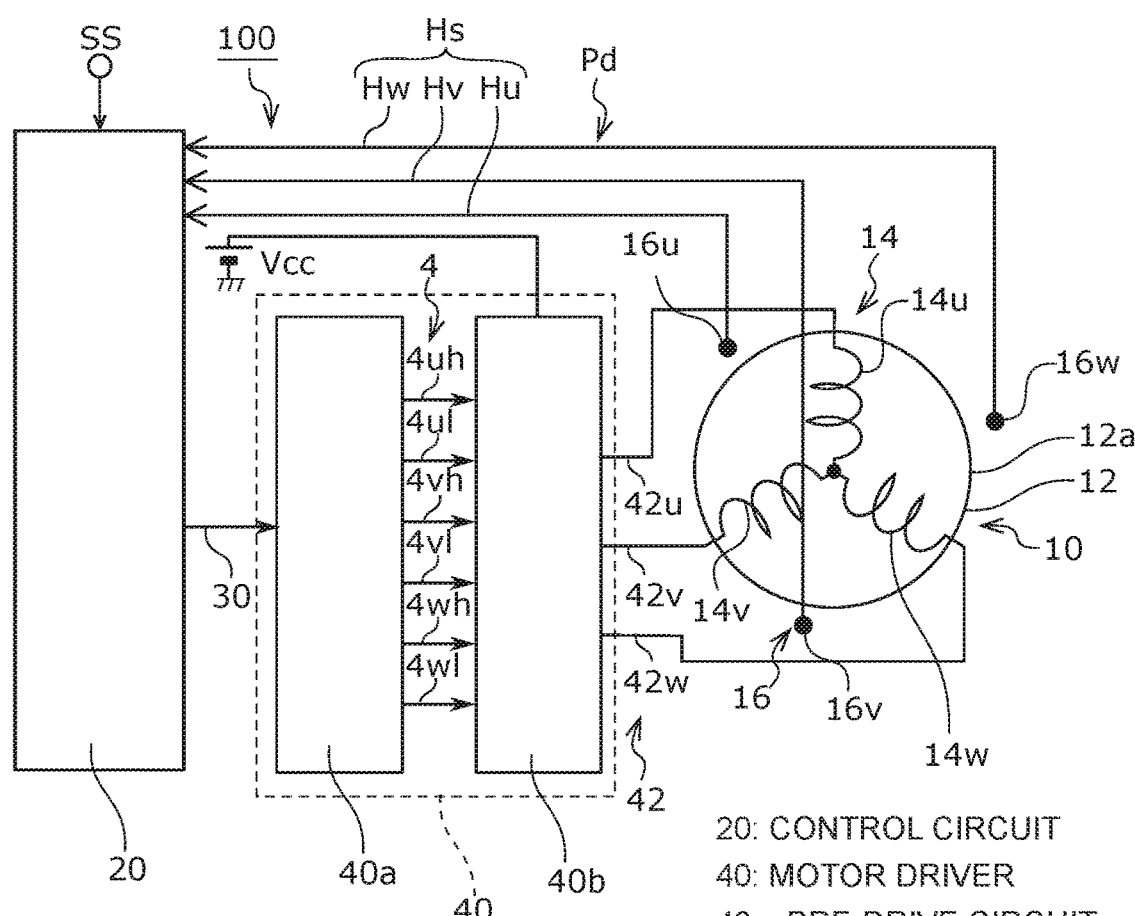
FIG. 1 is a block diagram showing a motor driving controller according to an embodiment.

First, the details for conceiving the present disclosure will be explained. FIG. 9 is a timing chart for switching a driving waveform in a conventional art. A control signal SS is a start-stop signal for driving a motor, and the motor stops at an L level, while the motor starts at an H level. HFG is an FG signal generated on the basis of an output of a Hall sensor and used for determining the state of stable rotation. For example, it is determined that the state where the frequency of the HFG is higher than a predetermined frequency is the state of stable rotation, and a control signal 90*a* is changed from the L level to the H level. When the control signal 90*a* is at the L level, the rectangular wave driving is selected and, when the control signal 90*a* is at the H level, the sine wave driving is selected. According to the conventional art, the rectangular wave driving is used at the time of starting and the driving is switched to the sine wave driving when the stable rotation is achieved. A driving signal 90*b* assumes a waveform of the driving signal of the stator coil, and the rectangular wave driving is used from the start to the switching point of the control signal 90*a*, while the sine wave driving is used at and after the switching point.

During the rectangular wave driving, a current flowing through a coil drastically changes at the time of commutation, so that an electromagnetic vibration occurs in the coil and this electromagnetic vibration causes a driving sound. Hereinafter, this driving sound, which is outstanding at the time of commutation, is expressed as a switching sound. In case of a three phase motor, when a rotor rotates by 360 degrees ($2\pi$) of the electric angle, the commutation of the coil is effected six times. Thus, when the driving is continued while the rectangular wave driving is used, the switching sound occurs whenever the commutation is effected, and therefore the switching sound occurs six times when the rotor rotates by 360 degrees ($2\pi$) of the electric angle. According to the conventional art in FIG. 9, the switching sound due to the commutation has occurred 15 times (equal to the number of level changes from the start to the switching point) from the start to the stable rotation.

As already described, in order to improve the uncomfortableness due to the starting noises, shortening the duration of the rectangular wave driving is effective. Namely, even at the same sound pressure level, the shorter the duration is, the more difficult it is to recognize the starting noises, therefore, when the sound pressure level lowers over a short period of time, the uncomfortableness can be attenuated. The duration of the rectangular wave driving at the time of starting in the conventional art of FIG. 9 is approximately 0.2 seconds to 0.5 seconds and, in this case, the rate of feeling uncomfortable is high. As a result of examination, the following knowledge is obtained. Namely, the duration of the rectangular wave driving at the time of starting is set to at most 0.1 seconds, preferably, at most 0.05 seconds, thereby to be capable of remarkably reducing the rate of feeling uncomfortable. The present disclosure is realized for shortening the duration of the rectangular wave driving at the time of starting on the basis of this knowledge.

Hereinafter, the present disclosure will be explained by referring to the drawings on the basis of a preferable embodiment. The same or equivalent components and members shown in the drawings have the same reference numerals, and repetition of the explanations is omitted appropriately. Further, the sizes of the members in the drawings are appropriately enlarged and reduced in order to facilitate understanding. Moreover, the members which are not important for explaining an embodiment in each drawing are partially omitted.

FIG. 1 is a block diagram showing a motor driving controller 100 according to an embodiment. As shown in FIG. 1, the motor driving controller 100 comprises a rotary position detection device 16, a control circuit 20 and a motor driver 40. The motor driving controller 100 controls driving start and driving stop of the motor 10 on the basis of a control signal SS inputted from a (non-illustrated) external device to the control circuit 20.

(Motor)

The motor 10 according to the present embodiment is a three phase brushless motor and includes a rotor 12, a stator coil 14, and a rotary position detection device 16. The rotor 12 has an annular magnet 12*a*, in which an N-pole magnetic pole and an S-pole magnetic pole are alternately provided in the peripheral direction. The magnet 12*a* has, for example, 10-poles as magnetic poles. The stator coil 14 includes a coil 14*u* of a U phase, a coil 14*v* of a V phase and a coil 14*w* of a W phase. The coils 14*u*, 14*v* and 14*w* constitute a three phase star connection. The stator coil 14 is disposed to be interlinked with a magnetic flux of the magnetic poles of the magnet 12*a*. When driving signals 42*u*, 42*v* and 42*w* are inputted to the stator coil 14, the stator coil 14 generates a rotary driving force in the magnet 12*a* by interaction with the magnetic poles of the magnet 12*a*.

(Rotary Position Detection Device)

A rotary position detection device 16 generates a position detection signal Pd on the basis of a rotary position of the rotor 12 of the motor 10. The position detection signal Pd may include a plurality of position detection signals each having phase differences. The position detection signal Pd may be generated depending on for example a magnetic flux density of the magnetic pole of the magnet 12*a*. In the motor driving controller 100 according to the embodiment, the rotary position detection device 16 includes Hall sensors 16u, 16v and 16w each having phase differences. The Hall sensors 16u, 16v and 16w are arranged at intervals of 120 degrees (2π/3) of electric angles in the circumferential directions. The Hall sensors 16u, 16v and 16w of the rotary position detection device 16 output a Hall signal Hs containing three phase Hall signals Hu, Hv and Hw as three position detection signals each having phase differences of 120 degrees (2π/3) depending on magnetic flux density of a magnetic pole of the magnet 12a. Namely, the position detection signal Pd contains three phase Hall signals Hu, Hv and Hw. The rotary position detection device 16 may output a Hall signal that is, for example, in a state of a sine wave, a trapezoidal wave or a rectangular wave. In the motor driving controller 100, the rotary position detection device 16 outputs a Hall signal Hs in a sine wave form.

(Control Circuit)

Figure 2:
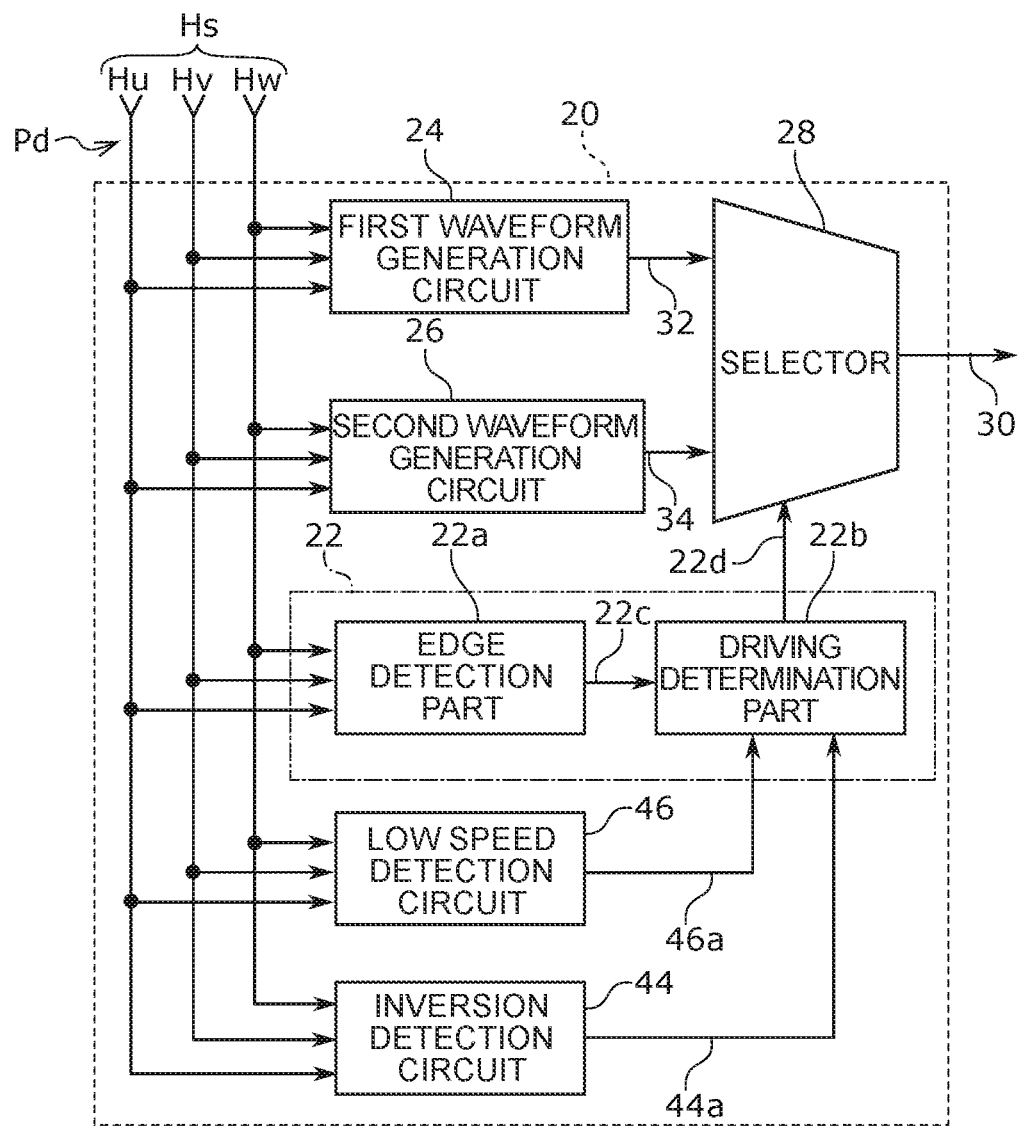
FIG. 2 is a block diagram showing a control circuit.

FIG. 2 is a block diagram of the control circuit 20. As shown in FIG. 2, the control circuit 20 selects a first driving control signal 32 for performing rectangular-wave driving depending on the position detection signal Pd or a second driving control signal 34 for performing driving with an overlapped energization period longer than an overlapped energization period of the rectangular wave driving, and then, the control circuit 20 outputs a driving control signal 30. The driving with an overlapped energization period longer than the overlapped energization period of the rectangular wave driving includes sine wave driving, trapezoidal wave driving and triangular wave driving.

(Rectangular Wave Driving)

Figure 3:
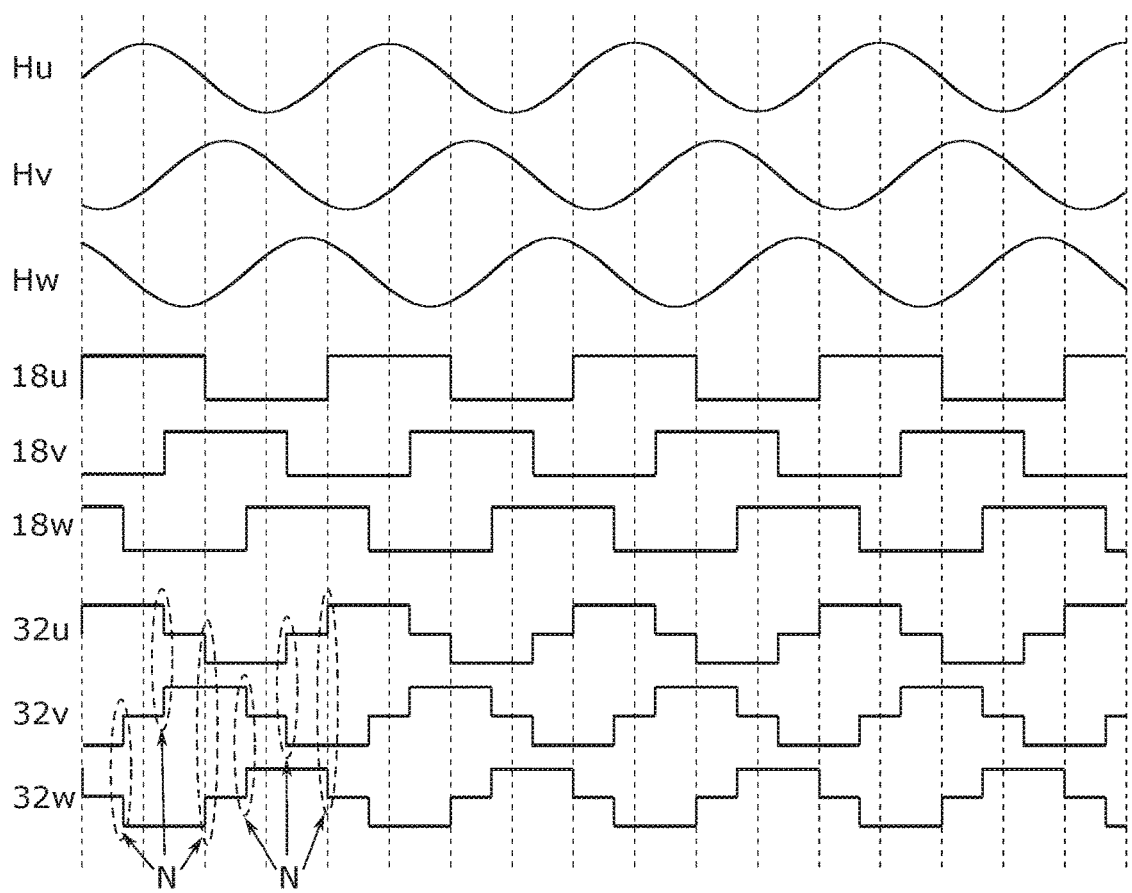
FIG. 3 is a timing chart for explaining rectangular wave driving.

Next, the rectangular wave driving will be explained. FIG. 3 is a timing chart of the rectangular wave driving in the motor driving controller 100 according to the embodiment. The rectangular wave driving is a driving system, in which three phase rectangular wave type driving signals are outputted to the coils 14u, 14v and 14w. A rectangular wave type driving signal is outputted and, therefore, when commutation with switching a direction of energizing a coil takes place, a period, during which coils of several phases are energized in an overlapping manner, hardly occurs. For this reason, currents flowing through the coils 14u, 14v and 14w will change drastically. During the rectangular wave driving, as already described, the switching sound is generated whenever the commutation takes place. In FIG. 3, "N" shows one example of a timing of generation of the switching sound.

(First Driving Control Signal)

In the motor driving controller 100, in order to perform the rectangular wave driving, the first driving control signal 32 is generated depending on the position detection signal Pd. As shown in FIG. 3, first, the sine wave type Hall signals Hu, Hv and Hw are amplified to generate a saturation signal 18 containing saturated signals 18u, 18v and 18w. This saturation signal 18 is converted by predetermined arithmetic processing to the first driving control signal 32 containing driving control signals 32u, 32v and 32w. Particularly, a first waveform generation circuit 24 described below outputs the first driving control signal 32, depending on the Hall signals Hu, Hv and Hw.

(Motor Driving Part)

A motor driver 40 outputs a drive signal 42 to the stator coil 14 of the motor 10 based on the driving control signal 30. The motor driver 40 includes a pre-drive circuit 40a and an inverter circuit 40b. When the first driving control signal 32 is selected, the driving control signal 30 which is the first driving control signal 32 is inputted to the pre-drive circuit 40a. On the basis of the driving control signal 30, the pre-drive circuit 40a outputs a PWM signal 4 at about 20 kHz to 100 kHz. The PWM signal 4 contains PWM signals 4uh, 4ul, 4vh, 4vl, 4wh and 4wl. The PWM signal 4 is inputted to a gate of each MOSFET (not shown in the drawing) constituting the three phase inverter circuit 40b. In the inverter circuit 40b, the MOSFET performs switching operation on the basis of the PWM signal 4. The motor driving part 40 has electric power supplied thereto from a power supply Vcc. The power supply Vcc may supply electric power to the control circuit 20. As a result, from the inverter circuit 40b, the drive signal 42 containing the drive signals 42u, 42v and 42w is outputted to the respective coils 14u, 14v and 14w. The drive signal 42 is inputted to the stator coil 14, so that a rotary drive force is generated in the magnet 12a by interaction with the magnetic poles of the magnet 12a.

(Sine Wave Driving)

Figure 4:
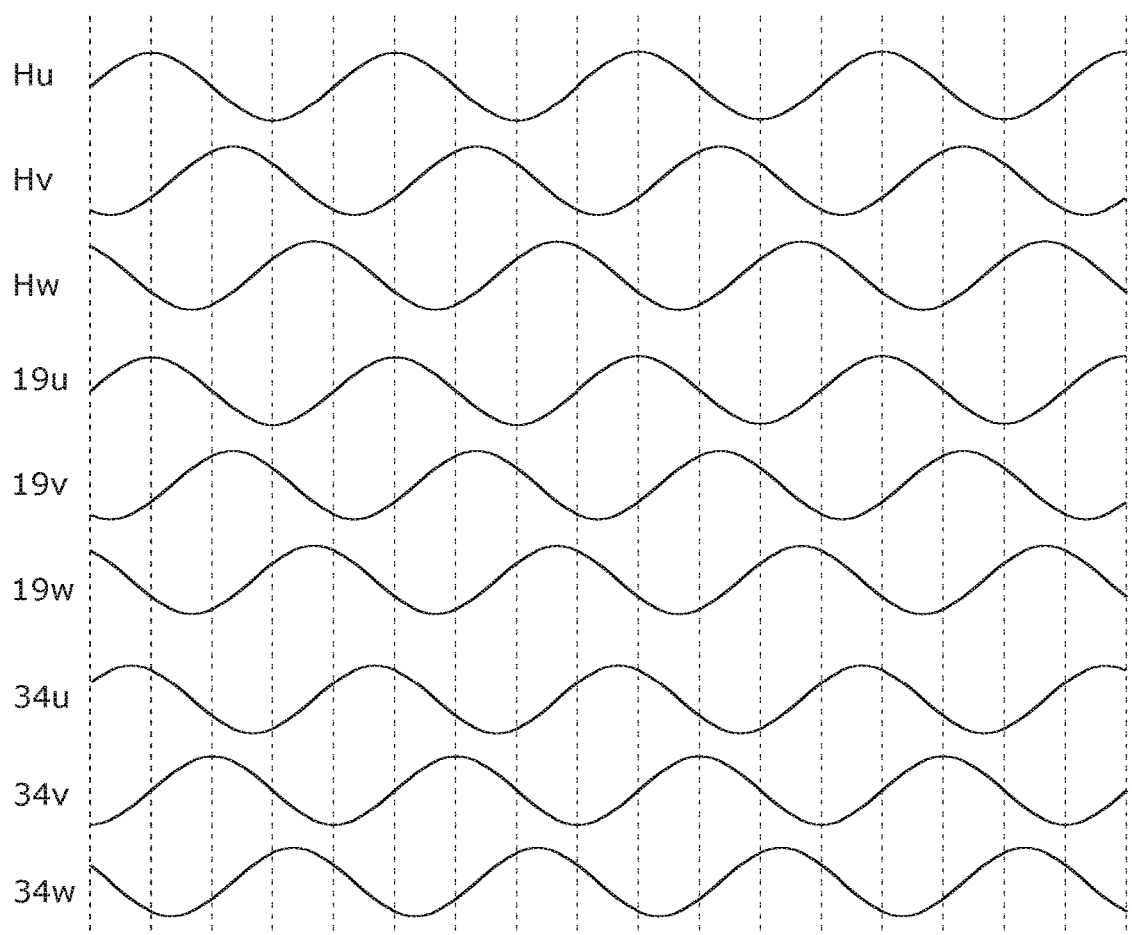
FIG. 4 is a timing chart for explaining sine wave driving.

Next, the sine wave driving will be explained. FIG. 4 is a timing chart of the sine wave driving in the motor driving controller 100 according to the embodiment. The sine wave driving is a driving system, in which three phase sine wave type driving signals are outputted to the coils 14u, 14v and 14w. During the sine wave driving, a sine wave type driving signal is outputted and, therefore, when commutation takes place to switch a direction of energizing a coil, a period, during which coils of several phases are energized in an overlapping manner, is long. The overlapped energization period of the sine wave driving is, for example, 60 degrees (π/3) of the electric angle. Therefore, currents flowing through the coils 14u, 14v and 14w change gently and, in comparison with the rectangular wave driving, the change of the coil current at the time of commutation is gentle in case of the sine wave driving and it is possible to restrict the sound pressure level of the switching sound of the stator coil 14 and then make it less outstanding. The present disclosure relates to the control for switching the rectangular wave driving and the driving with the overlapped energization period made longer than the overlapped energization period of the rectangular wave driving. The driving having the overlapped energization period longer than the overlapped energization period of the rectangular wave driving is not limited to the sine wave driving and includes substantially sine wave type driving as well, such as trapezoidal wave driving and triangular wave driving.

(Second Driving Control Signal)

In the motor driving controller 100, in order to perform the sine wave driving, the second driving control signal 34 is generated depending on the position detection signal Pd. As shown in FIG. 4, a non-saturation signal 19 containing signals 19u, 19v and 19w amplified in a non-saturation state from the sine wave type Hall signals Hu, Hv and Hw is generated. This non-saturation signal 19 is converted by predetermined arithmetic processing to the second driving control signal 34 containing driving control signals 34u, 34v and 34w. Particularly, a second waveform generation circuit 26 described below outputs the second driving control signal 34, depending on the Hall signals Hu, Hv and Hw.

When the second driving control signal 34 is selected, the driving control signal 30 which is the second driving control signal 34 is inputted to the pre-drive circuit 40a, and a PWM signal corresponding to the second driving control signal 34 is outputted to the three phase inverter circuit 40b. Due to this, from the three phase inverter circuit 40b, the three phase drive signal 42 corresponding to the second driving control signal 34 is outputted. The drive signal 42 is inputted to the stator coil 14, so that a rotary driving force is generated in the magnet 12a by interaction with the magnetic poles of the magnet 12a. These configurations are the same as those of the rectangular wave driving.

(Control Circuit)

Next, an operation for selecting a driving control signal of the control circuit 20 and outputting the driving control signal 30 will be explained. As shown in FIG. 2, the control circuit 20 includes a Hall change detection circuit 22, a first waveform generation circuit 24, a second waveform generation circuit 26, a selector 28, a low speed detection circuit 46, and an inversion detection circuit 44. The Hall change detection circuit 22 detects changes of the polarities of the Hall signals Hu, Hv and Hw to output a mode signal 22d. The first waveform generation circuit 24 generates the first driving control signal 32 based on the Hall signals Hu, Hv and Hw. The second waveform generation circuit 26 generates the second driving control signal 34 based on the Hall signals Hu, Hv and Hw. The selector 28 outputs, to the motor driver 40, the driving control signal 30 as a result of selecting either the first driving control signal 32 or the second driving control signal 34 based on the mode signal 22d of the Hall change detection circuit 22. The low speed detection circuit 46 and the inversion detection circuit 44 will be described later.

Figure 5:
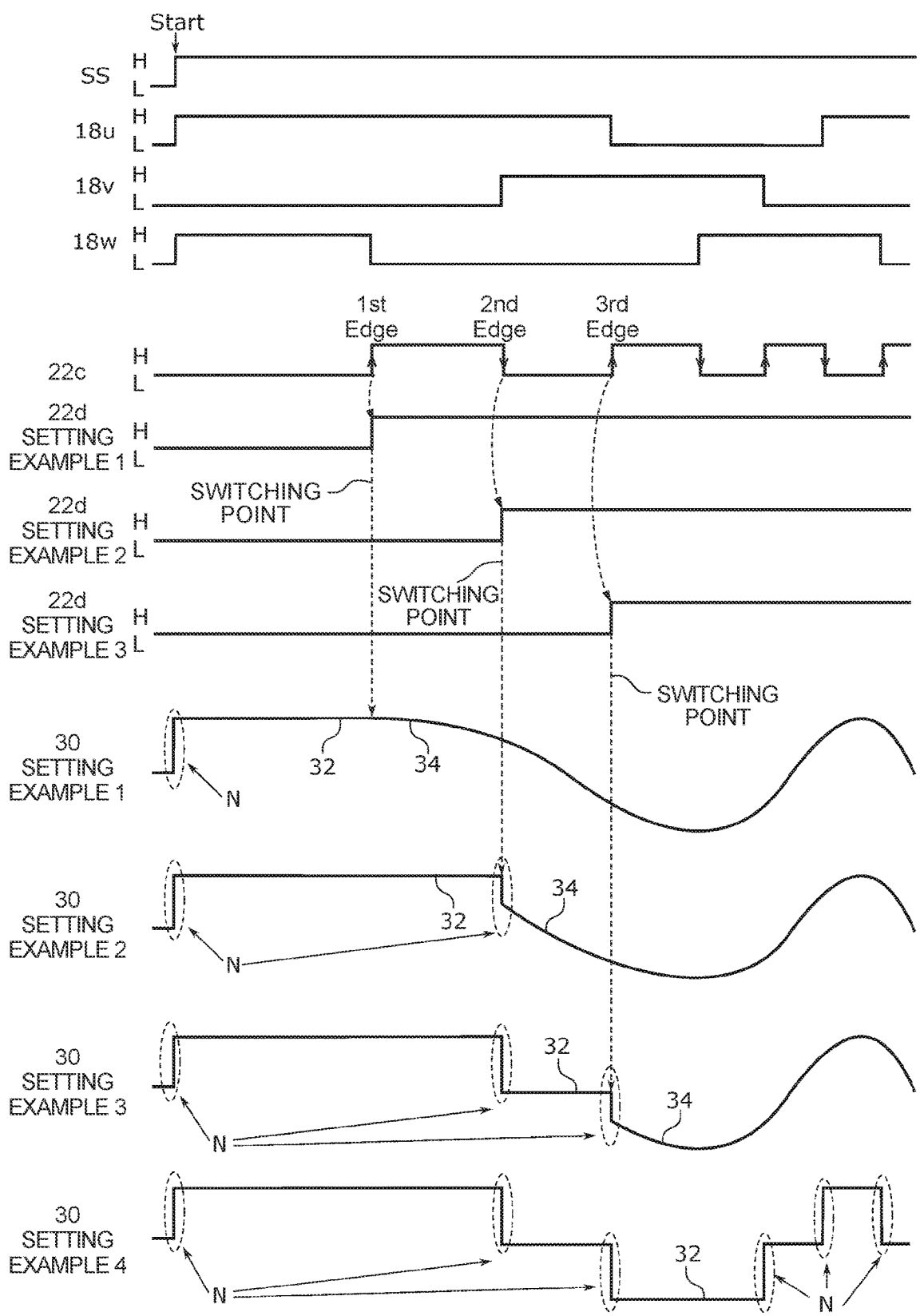
FIG. 5 is a timing chart for explaining operation of the control circuit.

FIG. 5 is a timing chart for explaining operation of the control circuit 20. As shown in FIG. 1, the control signal SS is a start-stop signal for driving the motor inputted from the external device to the control circuit 20, and the motor stops at level L, while the motor rotates at level H. An edge signal 22c is an output signal of an edge detection part 22a, the mode signal 22d is an output signal of the Hall change detection circuit 22, and the driving control signal 30 is an output of the selector 28 and corresponds to the U phase. The control circuit 20 outputs the first driving control signal 32 at the time of starting and outputs the second driving control signal 34 at the time of detecting the rotation state on the basis of the position detection signal Pd. Namely, the control circuit 20 selects and outputs the first driving control signal 32 when the motor is started from the stop state, and carries out the rectangular wave driving without a possibility to step out. Then, irrespective of the rotation speed, when a rotation state is detected, the second driving control signal 34 is selected and outputted thereafter to effect switching to the sine wave driving with low noises. Even at a timing before stable rotation, when a rotation state is detected, switching to the sine wave driving is effected and therefore the number of switching sounds due to the rectangular wave driving is reduced to be capable of attenuating uncomfortableness.

(Hall Change Detection Circuit)

Next, the Hall change detection circuit 22 will be explained. The Hall change detection circuit 22 of the control circuit 20 determines a rotation state depending on a change of the polarity of the Hall signal Hs, and outputs the mode signal 22d based on the determination result to the selector 28. The Hall change detection circuit 22 includes the edge detection part 22a and a driving determination part 22b. The edge detection part 22a outputs the edge signal 22c on the basis of a change of the polarity of any of the Hall signals Hu, Hv and Hw. Particularly, the edge detection part 22a converts the Hall signals Hu, Hv and Hw to the rectangular waves, executes an exclusive OR operation, and generates the edge signal 22c to output the edge signal 22c to the driving determination part 22b. The driving determination part 22b determines a rotation state on the basis of the edge signal 22c and outputs the mode signal 22d. As one example, the driving determination part 22b may count a rising edge and a falling edge of the edge signal 22c and then determine the rotation state when a predetermined count value is reached. The count value for determining the rotation state may be set depending on the degree of demands for noise reduction.

Next, setting the count value will be explained. From the viewpoint of shortening the time of the rectangular wave driving, as shown in a setting example 3 of FIG. 5, the count value for determining the rotation state may be set to 3. In this case, the following examination result is obtained. Namely, the switching sounds due to the commutation at the time of the rectangular driving are reduced to 3 to 4 times and the duration of the rectangular wave driving can be shortened to at most 0.1 seconds. In FIG. 5, "N" shows one example of a timing of generating the switching sound. Further, as shown in a setting example 2 of FIG. 5, the count value for determining the rotation state may be set to 2. In this case, the number of switching sounds due to the commutation at the time of the rectangular wave driving can be reduced. Further, as shown in a setting example 1 of FIG. 5, the count value for determining the rotation state may be set to 1. In this case, the following examination result is obtained. Namely, the number of switching sounds due to the commutation at the time of the rectangular driving is further reduced and the duration of the rectangular wave driving can be shortened to at most 0.05 seconds. By shortening the duration of the rectangular wave driving, the rate of feeling uncomfortable about the starting noises can be reduced. In the motor driving controller 100 according to the embodiment, the count value for determining the rotation state is set to 1. By implementing this configuration, the edge detection part 22a can determine the rotation state when the polarity of at least one of the Hall signals Hu, Hv and Hw from the starting changes. For reference, the driving control signal 30 in case of the rectangular wave driving only is shown in a setting example 4.

(Driving Determination Part)

A driving determination part 22b determines a driving mode based on outputs from the edge detection part 22a, the low speed detection circuit 46 and the inversion detection circuit 44, and then outputs the mode signal 22d corresponding to the determination result to the selector 28. At the time of starting, the driving determination part 22b is reset and the mode signal 22d is in a first mode (L level). The driving determination part 22b detects that the edge detection part 22a indicates the rotation state and then switches the mode signal 22d to a second mode (H level) and maintains the mode. Further, the driving determination part 22b detects that the low speed detection circuit 46 indicates a low speed state, and then, the driving determination part 22b is reset to switch the mode signal 22d to the first mode (L level). In this case, the first mode is maintained while the low speed state continues. Further, the driving determination part 22b is reset, when the inversion detection circuit 44 detects an inversion state, and switches the mode signal 22d to the first mode (L level). In this case, the first mode is maintained while the inversion state continues.

(Selector)

As already described, the first waveform generation circuit 24 performs a predetermined arithmetic processing on the saturation signal 18 generated from the sine wave type Hall signal Hs, thereby to convert the saturation signal 18 to the first driving control signal 32, and then, the first waveform generation circuit 24 outputs the signal to the selector 28. The second waveform generation circuit 26 performs a predetermined arithmetic processing on the non-saturation signal 19 generated from the sine wave type Hall signal Hs, thereby to convert the non-saturation signal 19 to the second driving control signal 34, and then, outputs the second driving control signal 34 to the selector 28. The selector 28 selects either the first driving control signal 32 or the second driving control signal 34 based on the mode signal 22d and outputs the selected signal to the motor driver 40, as the driving control signal 30. Particularly, the selector 28 outputs the first driving control signal 32 when the mode signal 22d is in the first mode (L level) and outputs the second driving control signal 34 when the mode signal 22d is in the second mode (H level). Namely, at the time of starting, in the low speed state and in the inversion state, the selector 28 outputs the first driving control signal 32, on the other hand, the selector 28 outputs the second driving control signal 34 when the rotation state after starting is determined.

(Low Speed Detection Circuit)

Figure 6:
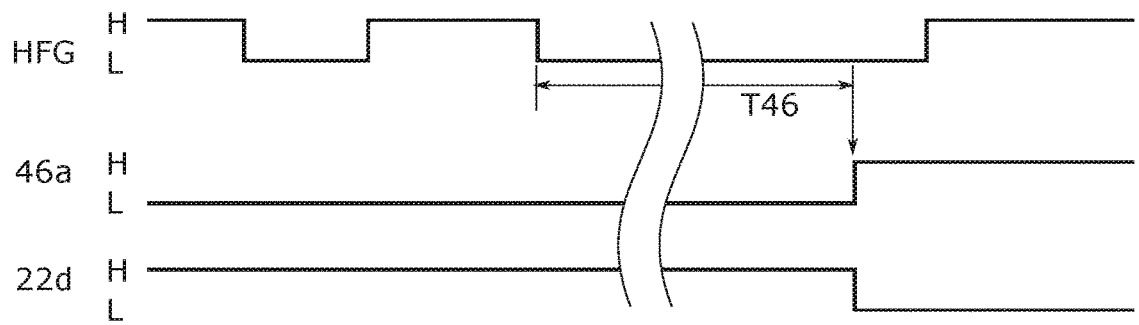
FIG. 6 is a timing chart for explaining operation of a low speed detection circuit.

Next, the low speed detection circuit 46 will be explained. FIG. 6 is a timing chart for explaining one example of the operation of the low speed detection circuit 46. After starting, in some cases, rotation is inhibited due to e.g. external force and a motor stops. In this case, when external force is canceled and a motor is restarted, a motor is desirably started by the rectangular wave driving. Then, in the motor driving controller 100 according to the embodiment, the control circuit 20 is configured to output the first driving control signal 32 when a predetermined low speed state is detected based on the position detection signal Pd. Particularly, the control circuit 20 includes the low speed detection circuit 46, and, when the periods of the Hall signals Hu, Hv and Hw exceed a predetermined time, the low speed detection circuit 46 determines the low speed state.

In FIG. 6, as one example, a method for making a determination by using a composite signal HFG synthesized by amplifying and saturating the Hall signals Hu, Hv and Hw will be explained. In the motor driving controller 100, as one example, a case where the rotation speed of the motor is at most 1 rpm is determined as the low speed state. Concretely, the low speed detection circuit 46 determines the low speed state at a timing when the half cycle (edge interval) of the composite signal HFG reaches a predetermined time T46 (for example 10 seconds), and the low speed detection circuit 46 switches a low speed signal 46a to the H level and then outputs the low speed signal 46a to the driving determination part 22b. The driving determination part 22b is reset by the low speed signal 46a and the mode signal 22d is switched to the first mode (L level). As a result, the selector 28 outputs the first driving control signal 32 and therefore the motor can be started with the rectangular wave driving at the time of restarting as well. Thereafter, the low speed detection circuit 46 switches the low speed signal 46a to the L level when the half cycle of the composite signal HFG is shorter than the predetermined time T46, and then, the low speed detection circuit 46 outputs the low speed signal 46a to the driving determination part 22b. In this case, the driving determination part 22b maintains the mode signal 22d at the first mode (L level) and switches the mode to the second mode (H level) when the edge detection part 22a determines the rotation state.

(Inversion Detection Circuit)

Figure 7:
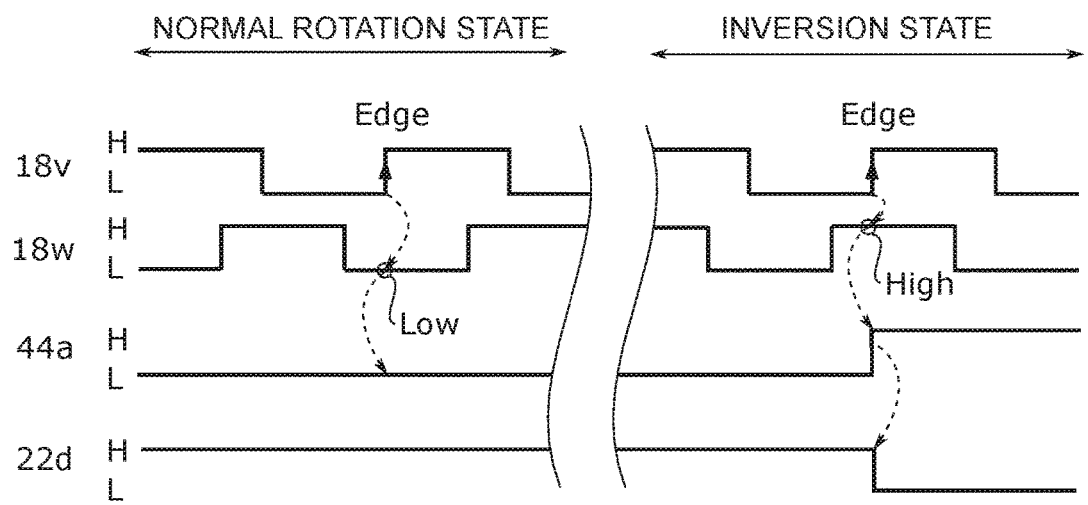
FIG. 7 is a timing chart for explaining operation of an inversion detection circuit.

Next, the inversion detection circuit 44 will be explained. FIG. 7 is a timing chart for explaining one example of the operation of the inversion detection circuit 44. For example, in a fan product, in some cases, a motor connected to a fan slightly rotates inversely due to an external air flow. Even if the motor rotates inversely, in case the motor rotates, the Hall change detection circuit 22 may determine that this case is in a state of rotating, and therefore there is concern about the rectangular wave driving being not effected at the time of starting during the inverse rotation. Then, in the motor driving controller 100 according to the embodiment, the control circuit 20 is configured to output the first driving control signal 32 when the inversion state is detected based on the position detection signal Pd.

Particularly, the control circuit 20 includes the inversion detection circuit 44, and the inversion detection circuit 44 determines the inversion state, depending on the respective timings of the polarity inversion of the Hall signals Hu, Hv and Hw. As one example, a method for making a determination by using signals 18v and 18w obtained by amplifying and saturating the Hall signals Hu, Hv and Hw will be explained. As shown in FIG. 7, the inversion detection circuit 44 determines a normal rotation when the signal 18w is at the L level at a timing of a rising edge of the signal 18v, and maintains the output signal 44a at the L level (the left half of FIG. 7). The inversion detection circuit 44 determines an inversion when the signal 18w is at the H level at a timing of a rising edge of the signal 18v, and then, changes the output signal 44a to the H level and maintains the output signal 44a (the right half of FIG. 7). The output signal 44a changes to the H level, and then, the driving determination part 22b is reset and the mode signal 22d is switched to the first mode (L level). As a result, the selector 28 outputs the first driving control signal 32 and therefore the motor can be started with the rectangular wave driving at the time of starting during the inverse rotation as well. Thereafter, the inversion detection circuit 44 determines the normal rotation and then switches the output signal 44a to the L level and outputs the output signal 44a to the driving determination part 22b. In this case, the driving determination part 22b maintains the mode signal 22d at the first mode (L level) and switches the mode to the second mode (H level) when the edge detection part 22a determines the rotation state.

Figure 8:
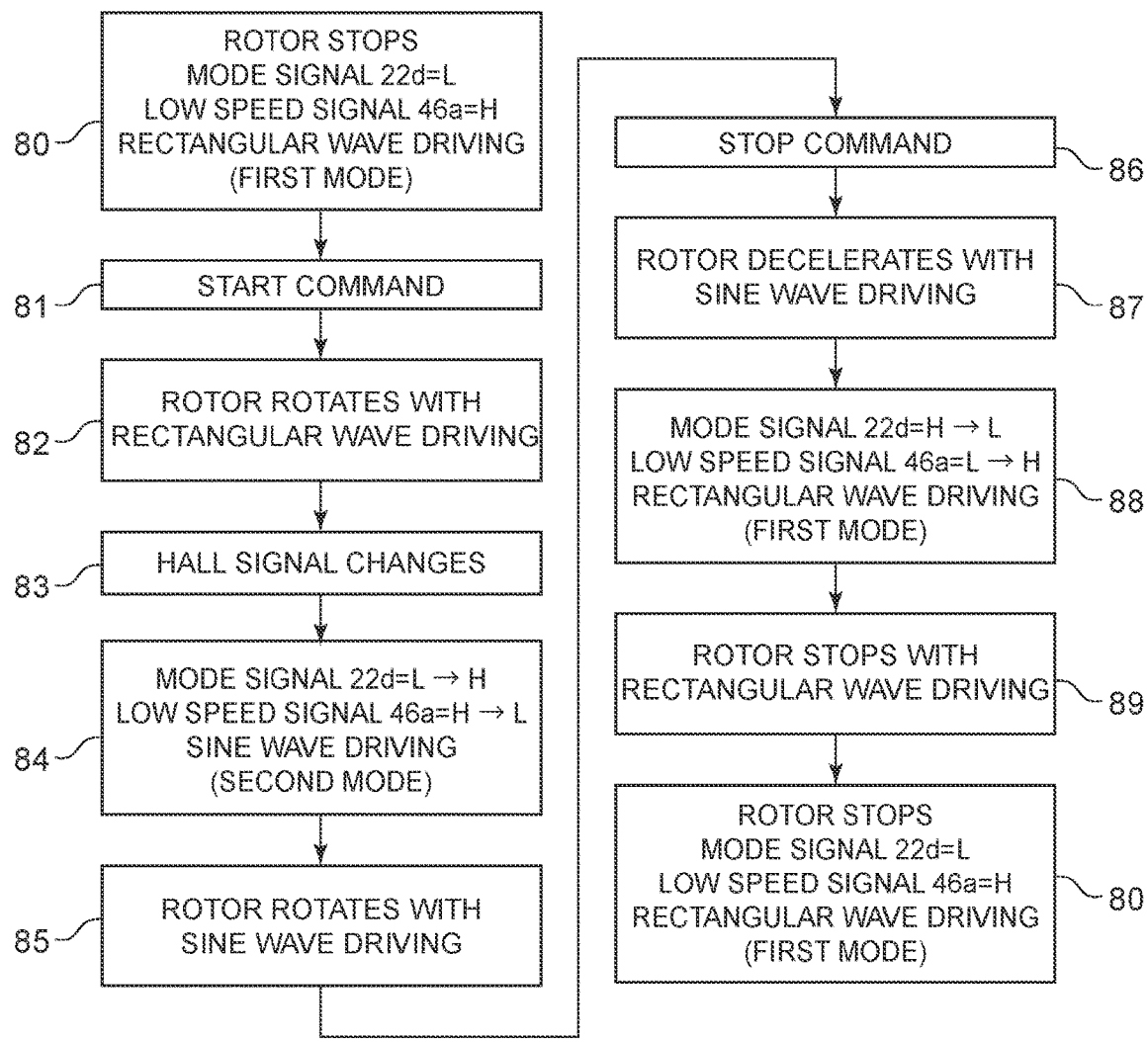
FIG. 8 is a flowchart for explaining a method for driving control of the motor driving controller.

Next, the operation of the motor driving controller 100 according to the present embodiment will be explained. FIG. 8 is a flowchart for explaining the operation of the motor driving controller 100. Step 80 relates to a state where the rotor 12 stops and waits. At step 80, since the Hall signal Hs does not change, the mode signal 22d is in the first mode (L level) and the low speed signal 46a is at the H level. As a result, the selector 28 selects and outputs the first driving control signal 32 and therefore the rectangular wave driving is effected. When a start command is inputted at step 81, a rotor 12 starts to rotate with the rectangular wave driving (step 82). When the rotor 12 rotates, the polarity of the Hall signal Hs changes (step 83). When the polarity of the Hall signal Hs changes, the low speed signal 46a changes to the L level and, when the polarity change of the Hall signal Hs reaches a predetermined count value, the mode signal 22d changes to the second mode (H level), and then the driving is switched to the sine wave driving (step 84). As a result, the rotor 12 continues to rotate with the sine wave driving (step 85).

Next, when a stop command is inputted at step 86, a rotor 12 decelerates with the sine wave driving (step 87). When the rotor 12 decelerates to a speed equal to or lower than a predetermined speed, the low speed signal 46a changes to the H level, the driving determination part 22b is reset and the mode signal 22d changes to the first mode (L level). As a result, the selector 28 selects and outputs the first driving control signal 32 and therefore the driving is switched to the rectangular wave driving (step 88). Then, the rotor 12 stops with the rectangular wave driving maintained (step 89), and the process returns to the waiting state at step 80.

Next, the relationship between the change of the polarity of the Hall signal Hs and the low speed signal 46a will be explained.

(Condition 1) The combination where the polarity of the Hall signal Hs does not change and the low speed signal 46a is at the non-low-speed state (L level) is a condition that cannot take place, while the rectangular wave driving is effected with the mode signal 22d in the first mode (L level).

(Condition 2) In a case where the polarity of the Hall signal Hs does not change and the low speed signal 46a is at the low speed state (H level), the driving determination part 22b is reset and the rectangular wave driving is effected with the mode signal 22d in the first mode (L level).

(Condition 3) In a case where the polarity of the Hall signal Hs changes and the low speed signal 46a is at the non-low-speed state (L level), the mode signal 22d of the driving determination part 22b is in the second mode (H level) and the sine wave driving is effected.

(Condition 4) In a case where the polarity of the Hall signal Hs changes and the low speed signal 46a is at the low speed state (H level), the driving determination part 22b is reset and the rectangular wave driving is effected with the mode signal 22d in the first mode (L level).

In a word, in the motor driving controller 100, the sine wave driving is effected under Condition 3 only, and the rectangular wave driving is effected under Conditions 1, 2 and 4 including the condition that cannot take place. As a result, even if the rotor moves slightly due to an external factor and the polarity of the Hall signal Hs changes, if the low speed signal 46a is in the low speed state (H level), the rectangular wave driving is maintained, and therefore, the rotor can be started not with the sine wave driving, but with the rectangular wave driving that seldom causes concern about stepping-out.

Next, a motor driving control method executed by the thus configured motor driving controller 100 will be explained. This motor driving control method includes outputting the first driving control signal 32 from the control circuit 20 at the time of starting and outputting the second driving control signal 34 from the control circuit 20 at the time of detecting the change of the polarity of the position detection signal Pd.

Next, the feature of the motor driving controller 100 according to the present embodiment will be explained.

In the motor driving controller 100, the control circuit 20 outputs the first driving control signal 32 at the time of starting, on the other hand, the control circuit 20 outputs the second driving control signal 34 at the time of detecting the rotation state on the basis of the position detection signal Pd. Therefore, in comparison with a case of separately providing a special member for detecting a rotation state, an arrangement space for the special member is not needed and is advantageous for miniaturization and can also avoid increase in costs due to the special member. Further, in comparison with providing a member made from rubber for absorbing vibrations between the motor and the fan, labor for assembling the member made of rubber can be omitted and increase in costs due to the member made of rubber can be avoided.

In the motor driving controller 100, the rotary position detection device 16 generates the Hall signals Hu, Hv and Hw as the three position detection signals each having phase differences, the control circuit 20 outputs the second driving control signal 34, when detecting a change of the polarity of any of the three Hall signals Hu, Hv and Hw. Therefore, in comparison with a case of using the single position detection signal, the rotation state can be detected more quickly and the duration of the rectangular wave driving at the time of starting can be further shortened.

In the motor driving controller 100, the control circuit 20 outputs the first driving control signal 32 when detecting a predetermined low speed state on the basis of the position detection signal Pd. Thus, even in case of restarting after the motor stops due to external force, etc., the motor is started by the rectangular wave driving, thereby to be capable of attenuating concern about stepping-out at the time of restarting. Further, the low speed state is detected on the basis of the position detection signal Pd and, in comparison with the case of separately providing the special member for detecting the low speed state, the present disclosure is advantageous for miniaturization and can avoid a cost increase.

In the motor driving controller 100, the control circuit 20 outputs the first driving control signal 32 when detecting the inversion state on the basis of the position detection signal Pd. Thus, even in case of starting in the inversion state due to external air flow, etc., the motor is started with the rectangular wave driving, thereby to be capable of attenuating concern about stepping-out in starting during the inversion state. Further, the inversion state is detected on the basis of the position detection signal Pd and, in comparison with the case of separately providing a special member for detecting the inversion state, the present disclosure is advantageous for miniaturization and can avoid a cost increase.

In the motor driving controller 100, the rotary position detection device 16 includes the Hall sensors 16u, 16v and 16w, the position detection signal Pd is the Hall signal Hs outputted by the Hall sensors 16u, 16v and 16w. Therefore, the rotary position of the rotor can be detected in a contactless manner, which is advantageous for miniaturization and weight reduction in comparison with a case of providing rotary encoders.

The motor driving controller 100 includes the selector 28 that selects and outputs either of the first driving control signal 32 and the second driving control signal 34 based on the output of the Hall change detection circuit 22. Thus, the rectangular wave driving by the first driving control signal 32 and the sine wave driving by the second driving control signal 34 can be smoothly and easily switched and outputted to the motor driving part 40. Moreover, the driving is switched depending on the output of the Hall change detection circuit 22, and therefore the present disclosure can be configured without providing a separate sensor for detecting the rotary state and is advantageous for miniaturization and cost reduction.

The above explanation has been made on the basis of the embodiments of the present disclosure. It is understood by the skilled person in the art that these embodiments are described as the examples, variations and modifications, are possible within the scope of the present disclosure, and these variations and modifications are within the scope of the present disclosure. Thus, the descriptions in the present specification and the drawings should be dealt not in a limited manner, but in an illustrating manner. The respective drawings for explaining the embodiments show one example of the configuration and the present disclosure is not limited to the example. Further, the steps in the flowcharts and the waveforms in the timing charts show one example and the steps and the waveforms are not limited to the example. For example, it is possible that another process is inserted between the respective steps, the processes are paralleled, the order of the processes are changed and a part of the process is deleted.

(Variation 1)

In the motor driving controller 100 according to the embodiment, the explanation has been made as to the example where the Hall change detection circuit 22 determines the rotary state on the basis of the edge signal 22c synthesized from the three Hall signals Hu, Hv and Hw, while the present disclosure is not limited to this example. The Hall change detection circuit may be configured to determine the rotary state on the basis of any Hall signal.

(Variation 2)

In the motor driving controller 100 according to the embodiment, the explanation has been made as to the example where the Hall change detection circuit 22 counts the edge of the edge signal 22c and determines the rotary state on the basis of the counting, while the present disclosure is not limited to this example. The Hall change detection circuit may be configured to detect a specific time (for example a time of a cycle or a half cycle) as to the Hall signal or its three phase composite signal, and to determine the rotary state if the specific time is less than a predetermined time (for example 27 ms). In this case, the present disclosure may be configured to effect the rectangular wave driving, if the specific time is equal to or longer than a predetermined time.

(Variation 3)

The explanation about the embodiment relates to the example where the motor is a three phase brushless motor, while the motor is not limited to this example. The motor may be, for example, a single phase, two-phase, or at least four-phase brushless motor.

(Variation 4)

According to the explanation about the embodiment, the respective components in the motor driving controller 100 mainly carry out the processes by hardware, while the present disclosure is not limited to this example. In at least a part of the motor driving controller, a component executing a process by software may be included. The process by software can be realized by for example using an MCU (Micro Control Unit).

(Variation 5)

The example where, in the motor driving controller 100, the rotary position detection device includes the Hall sensor has been explained, while the present disclosure is not limited to this example. The rotary position detection device may be a device detecting the position of the rotor by another mechanism, for example, a device detecting the position of the rotor based on counter-electromotive force induced by the stator coil. Further, the rotary position detection device may contain a rotary encoder.

(Variation 6)

The example where, in the motor driving controller 100 according to the embodiment, the first driving control signal 32 and the second driving control signal 34 are inputted to the pre-drive circuit 40a in a state of an analog signal and converted to a PWM signal in the pre-drive circuit 40a has been explained, while the present disclosure is not limited to this example. For example, the first driving control signal 32 and the second driving control signal 34 may be converted to the PWM signals, respectively, in the first waveform generation circuit 24 and the second waveform generation circuit 26, these signals are inputted to the pre-drive circuit 40a in the state of the PWM signals. In this case, the driving control signals 32u, 32v, 32w, 34u, 34v, 34 and 30 in FIGS. 3 to 5 show the analog waveforms corresponding to the PWM signals.

(Variation 7)

The example where, in the motor driving controller 100 according to the embodiment, the signals 19u, 19v and 19w as the analog signals amplified from the Hall signals Hu, Hv and Hw are used to generate the second driving control signal 34 has been explained, while the present disclosure is not limited to this example. For example, the second driving control signal 34 may be generated on the basis of digital signals converted from the Hall signals Hu, Hv and Hw by an AD converter. Similarly, the first driving control signal 32 may be generated on the basis of digital signals converted from the Hall signals Hu, Hv and Hw by an AD converter. Further, the second driving control signal 34 may be generated by a digital process on the basis of the saturation signal 18 saturation-amplified from the Hall signals Hu, Hv and Hw. In this case, the signals 18u, 18v, 18w, 19u, 19v, and 19w in FIGS. 3 and 4 show the analog waveforms corresponding to the digital signals. The above-described configuration reduces the ratio of the analog circuit and therefore it is advantageous for circuit integration.

(Variation 8)

The example where, in the motor driving controller 100, when the stop command is inputted, the rotor 12 decelerates with the sine wave driving has been explained, while the present disclosure is not limited to this example. For example, if a stop command is inputted, the energization to the stator coil 14 may be stopped for effecting deceleration, and counter-electromotive force induced by the stator coil 14 may be short-circuited to effect deceleration (short braking).

(Variation 9)

If necessary, the respective components of the motor driving controller 100 may be circuit-integrated at least partially.

What is claimed is:

1. A motor driving controller, comprising:
a rotary position detection device generating a position detection signal corresponding to a rotary position of a rotor of a motor, wherein the position detection signal comprises a plurality of position detection signals each having a phase difference;
a control circuit selecting a first driving control signal for performing rectangular wave driving or a second driving control signal for performing driving with an overlapped energization period longer than an overlapped energization period in the rectangular wave driving, wherein the control circuit generates an edge signal which switches between one of two binary states based on determining a change in polarity of any of the plurality of position detection signals irrespective of the rotation speed, and
wherein the control circuit generates a mode signal which switches between one of two binary states based on one or more transitions of the edge signal, and wherein the control circuit outputs a driving control signal by selecting from one of the first driving control signal and the second driving control signal based on the state of the mode signal; and
a motor driver outputting a driving signal to a stator coil of the motor based on the driving control signal, wherein
the control circuit outputs the first driving control signal at time of starting, and the control circuit outputs the second driving control signal when a rotary state is detected on the basis of the position detection signal.

2. The motor driving controller according to claim 1, wherein
the motor is a three-phase brushless motor;
the rotary position detection device includes three Hall sensors corresponding to the phases respectively, the plurality of position detection signals is the position detection signals having phase differences and generated by the three Hall sensors, respectively; and
the control circuit outputs the second driving control signal, when the control circuit detects a change of the polarity of the plurality of position detection signals any number of one to three times.

3. The motor driving controller according to claim 2, wherein
the control circuit outputs the second driving control signal, when the control circuit detects a single change of the polarity of the plurality of position detection signals.

4. The motor driving controller according to claim 1, wherein
the rotary position detection device includes a Hall sensor and the position detection signal is a Hall signal outputted by the Hall sensor.

5. The motor driving controller according to claim 4, wherein
the control circuit includes:
a Hall change detection circuit detecting a change of the polarity of the Hall signal;
a first waveform generation circuit generating the first driving control signal based on the Hall signal;
a second waveform generation circuit generating the second driving control signal based on the Hall signal; and
a selector selecting and outputting either of the first driving control signal and the second driving control signal based on an output of the Hall change detection circuit.

6. The motor driving controller according to claim 1, wherein
the control circuit outputs the first driving control signal when the control circuit detects a predetermined low speed state on the basis of the position detection signal.

7. The motor driving controller according to claim 1, wherein
the control circuit outputs the first driving control signal when the control circuit detects an inversion state on the basis of the position detection signal.

8. A motor driving control method executed by a motor driving controller, the motor controller including a rotary position detection device generating a position detection signal corresponding to a rotary position of a rotor of a motor, wherein the position detection signal comprises a plurality of position detection signals each having a phase difference, a control circuit selecting a first driving control signal for performing rectangular wave driving or a second driving control signal for performing driving with an overlapped energization period longer than an overlapped energization period in the rectangular wave driving,
wherein the control circuit generates an edge signal which switches between one of two binary states based on determining a change in polarity of any of the plurality of position detection signals, and
wherein the control circuit generates a mode signal which switches between one of two binary states based on one or more transitions of the edge signal, and
wherein the control circuit outputs a driving control signal by selecting from one of the first driving control signal and the second driving control signal based on the state of the mode signal, and
a motor driver outputting a driving signal to a stator coil of the motor based on the driving control signal, the motor driving control method comprising:
outputting the first driving control signal from the control circuit at time of starting; and
outputting the second driving control signal from the control circuit when a change in polarity of any of the plurality of position detection signal is detected irrespective of the rotation speed.

* * * * *